July 22, 1924.
G. A. BANNISTER
SANDWICH DISPENSER
Filed Feb. 20, 1922
1,502,325
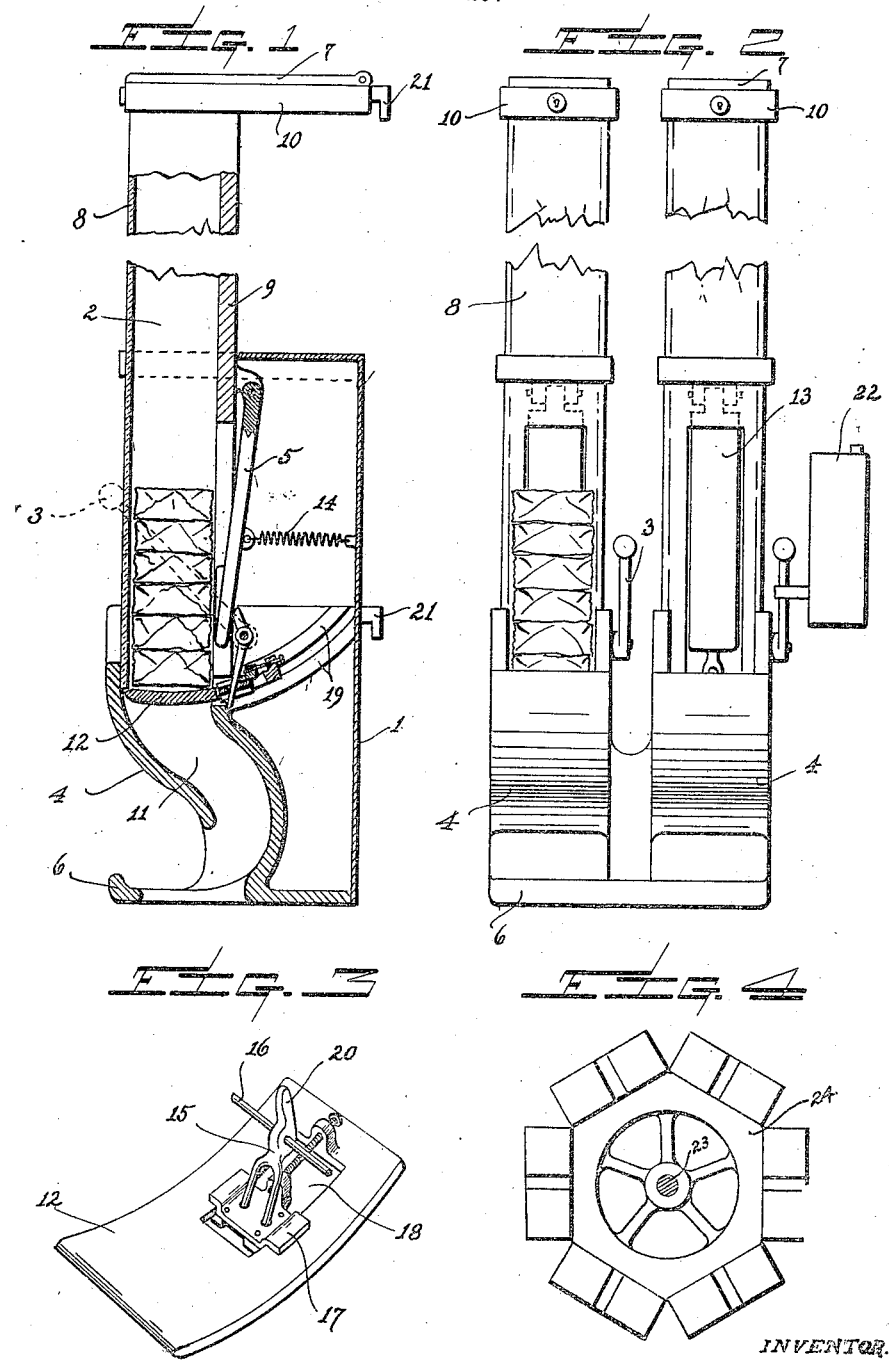
INVENTOR.
GRANT A. BANNISTER.
BY
ATTORNEY.

Patented July 22, 1924.

1,502,325

UNITED STATES PATENT OFFICE.

GRANT ABNER BANNISTER, OF BRIDGEPORT, CONNECTICUT, ASSIGNOR OF ONE-HALF TO MARY EMMA DENTLER, OF BRIDGEPORT, CONNECTICUT.

SANDWICH DISPENSER.

Application filed February 20, 1922. Serial No. 537,725.

*To all whom it may concern:*

Be it known that I, GRANT ABNER BANNISTER, a citizen of the United States, and resident of Bridgeport, in the county of Fairfield and State of Connecticut, have invented certain new and useful Improvements in Sandwich Dispensers, of which the following is a specification.

This invention relates to food dispensing apparatus and in particular to a novel machine for dispensing compressible units such as sandwiches.

An object of the invention is to provide an improved sandwich dispensing apparatus which is particularly adapted for use in public places such as railway coaches, stations, counter-restaurants and the like.

Another object is the provision of a machine which will dispense several kinds of sandwiches and when desired may be made responsive to coin control apparatus to be operated by the purchaser.

A further object is to provide a compact and neat sanitary machine that will hold a large number of sandwiches and will dispense one at a time and will protect the others from dust and dirt particles and from persons desiring to pilfer the machine.

Other objects of the invention will be readily noted upon a reading of the detailed description.

This invention has been developed to meet an important need of the traveling public and of the public whose time is limited. The particular need relates to food, and my invention has to do with an apparatus that will quickly and efficiently serve the purchaser with small food units. For the purposes of description, the apparatus will be described in connection with the dispensation of sandwiches, but it is to be understood that the principles of operation may be employed in apparatus to dispense other food units or other articles. My dispensing machine as designed to dispense sandwiches is compact so that it may be readily placed in small spaces. This feature is particularly desirable as there has always been a need for a sandwich dispensing machine that could be readily placed in a railway coach and that would serve satisfactorily both the purchaser and owner while at the same time it maintains the food in edible condition.

The accompanying drawings which form a part of this specification illustrate one form of apparatus which I have selected as embodying my invention. In these drawings—

Figure 1 is a side elevational view partly in section of a dispensing unit,

Figure 2 is a front elevational view of two units,

Figure 3 is a view in perspective of a base which is one of the important operating parts of each unit, and Figure 4 is a top plan view of several of the units mounted on a standard.

In describing in detail the preferred form of apparatus, I will describe only one of the units as the other units will be similar or will have the principles of operation included in them. Referring now to Fig. 1 this preferred form of unit comprises a frame 1, a sandwich magazine or holder 2, an operating lever 3 for releasing the sandwich, a protecting member 4 which also acts as a guide, and a movable member or back portion or sub back 5 which functions to hold the sandwiches in the magazine while the operating lever is moved.

The design or construction of the unit may be varied to meet the various purposes and conditions of use but I have found that the vertical design, as illustrated, satisfactorily meets substantially all of the requirements. This vertical unit permits the sandwiches to be placed on their sides thereby increasing the number of sandwiches in each unit, and it also permits taking advantage of gravity to move the sandwiches to releasing position and from that position to a dispensing platform 6. It is however to be understood that in some designs of dispensers any well known mechanical expedients connected to the operating lever 3 may be employed to move the sandwiches from one position to another.

The unit is filled by first unlocking cover 7 and throwing it back, raising front glass plate 8 and introducing the sandwiches into the magazine 2 in position as shown in Fig. 1. It is preferred to have the plate 8 of glass although it may be made of other materials and in case they are not transparent it is desirable to have a glass insert to observe the condition of supply. The sides of the magazine are usually made of pressed metal, and the back 9 is preferably integral with the frame 1 and is adapted to carry a supporting member 10 on its top for supporting the cover 7.

The sandwiches are released by pulling lever 3 downward operating a mechanism which frees one sandwich at a time so that it will slide down channel 11 to platform 6 where it is easily picked up by the operator. The machine may be arranged, if desired, to permit the release of more than one unit or sandwich at a time. The protecting member 4 acts as the outer guide of the channel and the curvature and length thereof are such that a person cannot insert their hand or a tool to obtain other sandwiches. This construction for protecting the unreleased sandwiches has proven satisfactory but other forms may be devised to prevent pilfering.

Any suitable mechanism may be employed to release the sandwiches. My preferred mechanism however is simple in construction and consists of a base 12 oscillated to and from a position under the end of the magazine, and the sub back or movable member 5 which swings in an opening or slot 13 and against two or more of the sandwiches and moves them against the front of the magazine and exerts a slight pressure on them to prevent them from dropping. The movable member 5 is provided with a surface or area of sufficient size to substantially simultaneously engage the edges of a number of units or sandwiches when the member is moved by the operation of the operating lever 3. When the base is in normal position under the magazine it supports all of the sandwiches and when moved to releasing position it is back out of the way and permits the sandwich which was in contact with its top surface to drop down into channel 11. As the lever 3 is moved downward to move the base backward the sub back 5 is moved forward against two or three or more of the sandwiches just above the one released and holds them in their original positions until base 12 is moved back to normal position. It is preferred to have the lower end of sub back member 5 so constructed that it will pinch several of the sandwiches slightly instead of pinching one of them a material amount. A spring 14 engaging the sub back or movable member 5 and a part of the frame 1 functions to draw the sub back from pinching or pressure exerting position to its out position and allows the sandwiches to fall onto the base 12.

The preferred constructions of the base and the releasing mechanism are shown in Figs. 1 and 3. The base is usually somewhat curved to permit easy movement thereof within its restricted space in the frame 1. This base is supported by a fork or pivoted arm 15 rigidly affixed to shaft 16 which also carries the operating lever 3. For purposes of adjusting the base with the operation of the lever 3 I have provided a member 17 adjusted in a slot 18 in the base. Such an arrangement of parts permits the base to be easily moved between guides 19. The sub back or member 5, or the whole back 9 if pivoted, is moved forward by means of an extension 20 carried by the fork 15. Thus when the lever 3 is pulled down the base is moved backward and the movable member is moved forward.

The particular construction of the frame 1 provides hooks 21 so that the unit may be hung in any desired place. Also the platform 6 is preferably slotted so that it will not collect dirt to be picked up by the sandwiches as they are delivered.

In Fig. 2 I have shown two of the dispensing units placed beside each other, and for purposes of illustration I have shown a coin control mechanism 22 for governing the operation of lever 3. Any suitable coin mechanism may be employed for each of the dispensers.

It may be desirable in some instances to have several of the dispensing units positioned in a minimum space, and I have therefore shown in Fig. 4 one means of accomplishing this result. I have provided a shaft 23 of a standard not shown upon which is mounted a revolving drum 24. Several of the dispensers may be attached to the drum and notations made on the front of each dispenser of the kind of sandwiches it contains. It is to be understood that in this arrangement or in the wall dispensers that each of them may be locked or fastened in position so that they cannot be removed by persons other than the owner. Any of the well known locking mechanisms may be employed for this purpose.

The apparatus herein shown and described as embodying my invention illustrates a simple and efficient means for dispensing sandwiches and it is particularly adapted to be employed in railway coaches and counter restaurants. Certain changes and modifications may be made in the particular apparatus, but such changes are considered as being within the scope of my invention as outlined in the following claims:

1. In a machine for dispensing compressible units, a magazine for receiving a supply of said units, suitable mechanism incorporated in said machine for dispensing one unit at a time, a member provided with a surface adapted to engage two or more units above the unit to be dispensed, said member arranged to be moved to engage the units and to slightly press them against another part of said machine to hold them and the units thereabove within said magazine while the one unit is being dispensed.

2. In a machine for dispensing units of a compressible nature, a magazine for receiving a supply of said units, a mechanism operating to release said units in a pre-determined manner, a member operable during the period of releasing to engage a number of said compressible units to move them into positive contact with another part of said machine to thereby exert a slight pressure thereon to hold them from falling, said member being provided with a surface of sufficient size to engage the units substantially simultaneously, said releasing mechanism being associated with said member to move the same during the dispensing operations.

3. In a dispensing machine the combination of a magazine for holding a plurality of sandwiches, a base arranged to normally support said sandwiches in said magazine and adapted to be moved from its normal position when a sandwich is being dispensed from said machine, and a movable member forming part of the back of said magazine and being provided with a surface sufficiently large to engage a number of said sandwiches, said member arranged to be moved to engage the sandwiches and move them into contact with the opposite side of said magazine and to exert a slight pressure on said engaged sandwiches thereby preventing them and the sandwiches above from falling during the time of dispensing one sandwich.

4. In a sandwich dispensing machine, the combination of a magazine for holding a plurality of sandwiches, a movable base for said magazine, said base arranged to oscillate to release said sandwiches one at a time, a movable member forming part of the back of said magazine and being provided with a surface sufficiently large to engage two or more of the sandwiches in said magazine, said member adapted to be moved against said sandwiches to move them into positive contact with another position of said magazine and to exert a slight pressure thereon to prevent them and the sandwiches thereabove from falling during the releasing of one sandwich, and an operating handle for moving said base and said member.

5. A machine for dispensing compressible food units such as sandwiches, comprising a magazine for receiving the sandwiches, a base for closing the bottom of said magazine and being so arranged as to be oscillated to another position to release a sandwich from said magazine, a suitable arm for moving said magazine, a movable member having a pre-determined area for engaging several sandwiches and being so constructed as to be operated by said arm as to move said sandwiches into contact with another part of said machine and to exert a slight pressure on said sandwiches to thereby hold them and the sandwiches above within the magazine while one sandwich is being released, and a suitable guiding member associated with said magazine for guiding the released sandwich to a perforated receiving platform and also being arranged to protect the remaining sandwiches against being pilfered.

6. A sandwich dispensing machine comprising a sandwich receiving magazine provided with an opening in the back portion thereof, a movable member adapted to fit into said opening and arranged to be pivoted to said back portion, said member being provided with an area for simultaneously engaging two or more sandwiches to force them against the front wall of said magazine and to exert a slight pressure on said sandwiches to hold them and the sandwiches above them in normal position while one sandwich is being dispensed, a pivoted member for engaging an extension of said base and being adapted to engage said movable member, and an operating arm for oscillating said pivoted member thereby moving said base to allow a sandwich to fall from said magazine and moving said movable member.

7. A machine for dispensing sandwiches comprising a magazine for receiving a plurality of sandwiches laid on their sides, a movable base for completely closing the bottom of said magazine thereby protecting said sandwiches from foreign materials, said base arranged when in normal position to support said sandwiches in said magazine, a member provided with a surface of sufficient area to engage the edges of at least two of said sandwiches, a mechanism operable to cause one sandwich to be dispensed from said machine, said mechanism associated with said member in a manner to cause said member to engage the edges of two or more of said sandwiches to force them into contact with the opposite wall of said magazine and to exert a slight pressure on said sandwiches to hold them from falling, a pivoted arm included in said mechanism and arranged to engage said base and said member and adapted to operate them, and a handle for operating said arm.

8. A machine for dispensing compressible food units comprising a magazine for receiving the units, a slidable base for completely closing the bottom of said magazine to prevent the introduction of foreign materials and being adapted to slide in the arc of a circle to a position which allows one of the units to fall from said magazine, a pivoted arm adapted to adjustably engage an extension of said base and to move said base to dispense one of the food units, and an oscillating member having a surface for simultaneously engaging two or more of said units to force them into contact with another part of said machine and to cause said units to be put under slight pressure thereby preventing the units from falling while one unit is being dispensed, and said member being operated by a portion of said arm.

9. In a sandwich dispensing machine, the combination of a standard having a rotary drum thereon, a plurality of magazines adapted to be affixed to said drum, each of said magazines provided with an operating mechanism for releasing one sandwich at a time and a movable member having a surface for engaging the edges of several of the remaining sandwiches to force them agaist another wall of said magazine to thereby hold them and the other sandwiches in normal position in said magazine during dispensing operations, said member arranged so as not to materially press any one sandwich to detrimentally compress it and a depending curved member arranged to act as a guide to the freed sandwich.

Signed at Bridgeport, in the county of Fairfield and State of Connecticut, this 30th day of January, A. D. 1922.

GRANT ABNER BANNISTER.